Sheet 1 – 2 Sheets.
Henry Lippold's
Improved Corn Sheller.
118139
PATENTED AUG 15 1871
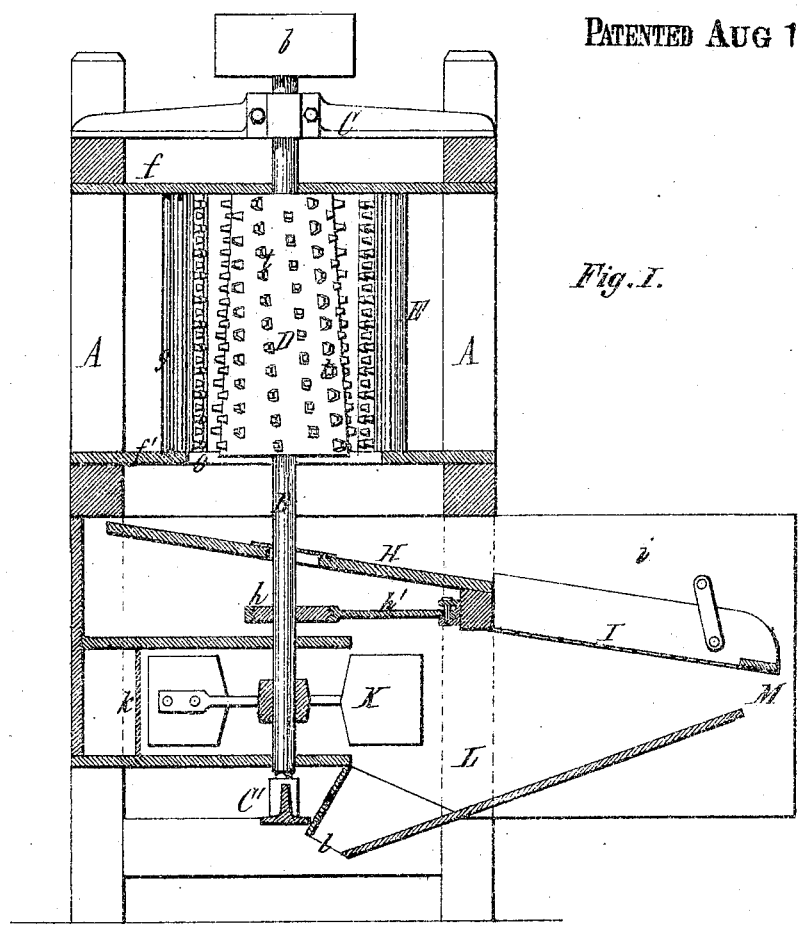
Fig. I.
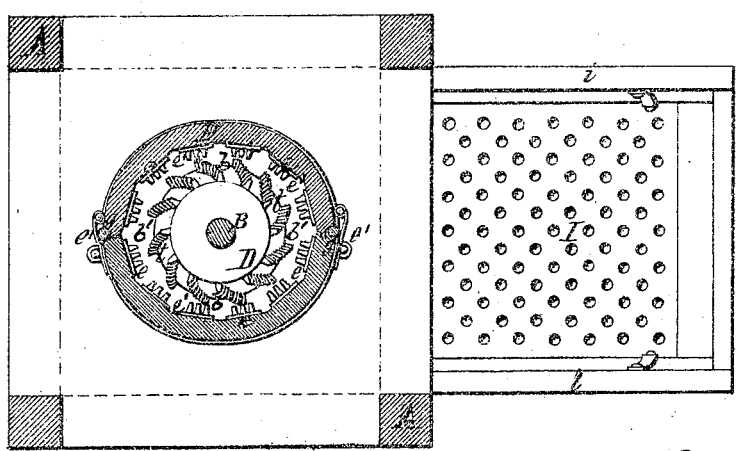
Fig. II.
Edward Wilhelm  
Jno. J. Donner  
*Witnesses*
Henry Lippold *Inventor*  
by Forbush & Hyatt  
*Attys.*

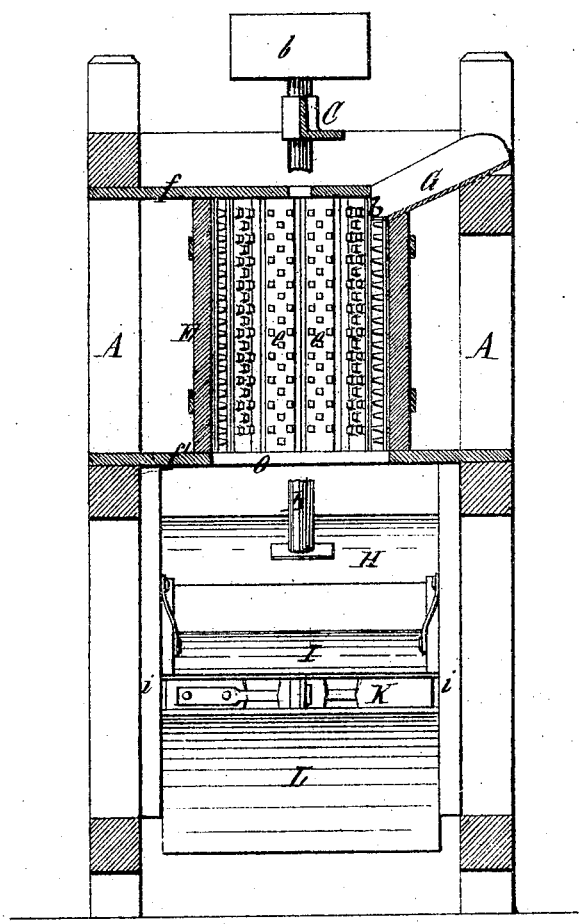

United States Patent Office.

HEINRY LIPPOLD, OF SILVER CREEK, NEW YORK, ASSIGNOR TO HIMSELF, LEROY ANDRUS, AND GEORGE HAMAN, OF SAME PLACE.

IMPROVEMENT IN MACHINES FOR SHELLING CORN.

Specification forming part of Letters Patent No. 118,139, dated August 15, 1871.

*To all whom it may concern:*

Be it known that I, HEINRY LIPPOLD, of Silver Creek, in the county of Chautauqua and State of New York, have invented certain new and useful Improvements in Corn-Shelling Machines, of which the following is a specification:

My invention consists: First, in the combination and arrangement, with a revolving beater of a corn-sheller, of a surrounding shelling-case, elliptical in horizontal section on its interior, whereby a rotary motion is imparted to the ears as they pass around and through the sheller. Second, in the arrangement, within and upon each side of an elliptical polygonal case inclosing a rotary beater, of a vertically-arranged toothplate, sufficient space being left between said plate at the angles of the case for the separation and descent of the kernels. Third, in the construction and arrangement, as hereinafter described, of the rotary beater and inclosing-case with a shaker, sieve, and fan, all operated by the same shaft for the purpose of shelling corn and separating it from the cobs.

In the accompanying drawing, Figure I is a sectional elevation of my improved machine; Fig. II, a horizontal section on line $x\ x$; Fig. III, a side elevation, partially in section.

Like letters designate like parts in each of the figures.

A represents the frame of the machine; B, the vertical shaft driven by a pulley, $b$. C is the upper bridge-tree, and C' the lower bridge-tree, supporting the shaft B. D is the conical beater, attached to the shaft B near its upper end. It is provided with teeth $t$, arranged in rows spirally on the surface of the beater for the purpose of impelling the ears of corn downward while being revolved by the beater. E is the case, inclosing the beater D. Its toothed inner surface is elliptical in horizontal section, the points of nearest contact with the beater being on the side of the feed-spout and the side opposite thereto, as shown at $b$, while the points at right angles thereto are further separated from the beater, as shown at $b'\ b'$. The inner surface of the case E forms a polygonal prism, as clearly shown in Fig. II. A strip of metal, $e$, provided with teeth is attached to each side of the prism, leaving sufficient space between every pair of strips for the ears of corn to turn in. The case E is formed in halves jointed at $e'\ e'$, so that the beater D is easily accessible as well as the inside of the case. $f$ is the top of the case attached to the frame A, and tightly fitting on the beater D and case E. $f'$ is the bottom thereof, likewise attached to the frame A, but cut out so as to leave an annular opening, $o$, around the lower end of the beater D for the discharge of the corn and cobs. $g\ g$ are two rods running from the top $f$ to the bottom $f'$ through the joints $e'\ e'$, for the purpose of marking the proper location of the latter with reference to the beater D. G is the spout through which the ears of corn are fed into the space $b$ between the beater and the case. H is the shaker arranged below the sheller. It works in inclined guides attached to the frame A, and is operated by an eccentric, $h$, attached to the shaft B and rod $h'$. I is an inclined sieve, forming an extension of the shaker. It is at one end attached to the latter, and at the other end hung to side boards $i$, projecting from the frame A. K is the fan, located below the shaker and mounted on the shaft B. $k$ is the fan-case, partially inclosing the fan. L is a hopper arranged underneath the sieve I, and $l$ the nozzle, to which the discharge-spout may be attached.

The operation of my machine is as follows: The ears of corn being fed through spout G into the space between the beater D and case E, they are revolved by the action of the beater and shelled by coming in contact with the teeth, the inclination of the rows of teeth on the beater forcing the ears downward and the spaces between the rows of teeth at the angles of the case and the spaces $b'$ at the ends thereof, allowing the same to turn so as to bring all parts of the ear under the action of the teeth, while a free separation of the kernels from the cob is permitted as they are detached therefrom, thereby lessening the liability of the breaking of the kernels. The kernels and cobs drop through the opening $o$ upon the shaker H, and are delivered by its action upon the shaking-sieve I. The latter distributes the mass of kernels and cobs upon its surface, the kernels dropping through the openings of the sieve while the cobs are discharged at the end thereof and received in a convenient receptacle. The fan K creates an air-current between the sieve H and the bottom of the hopper L, finding an outlet at M. This current takes up the fragments of cobs which may work through the openings in the sieve, and discharges the same at M. The kernels drop into the hopper L and discharge at *l*.

I claim as my invention—

1. The combination, in a corn-sheller, of the beater D and the elliptical shelling-case E, arranged as described.

2. The arrangement, with the beater D, of the elliptical case E, provided with polygonal interior surface and toothed plates *e* and intervening spaces *e'*, as hereinbefore set forth.

3. The combination and arrangement of the beater D and inclosing-case E, constructed as described, with the shaker H, sieve I, and pan K, as hereinbefore set forth.

HEINRY LIPPOLD.

Witnesses:
CHAS. McNEAL,
THEO. STEWART.